May 28, 1968
A. F. JOHNSON
3,385,778
CURRENT COLLECTING METHOD AND APPARATUS FOR
ALUMINUM REDUCTION CELLS
Filed Oct. 21, 1964
5 Sheets-Sheet 1
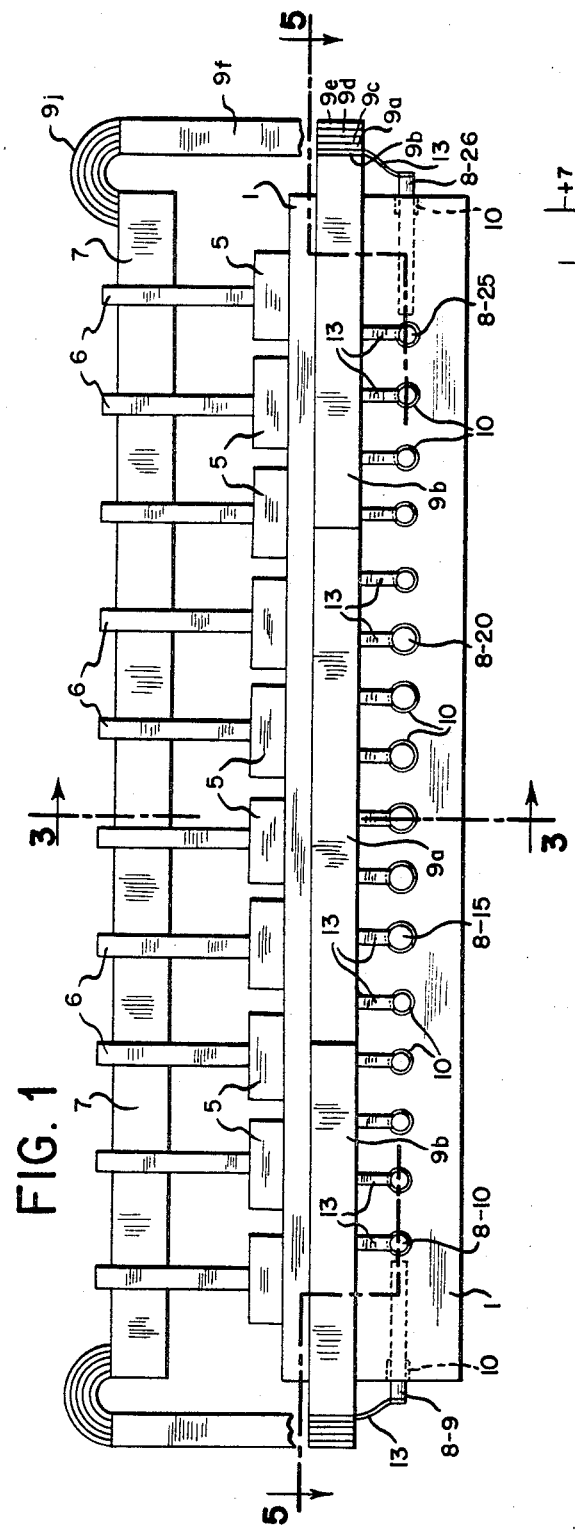
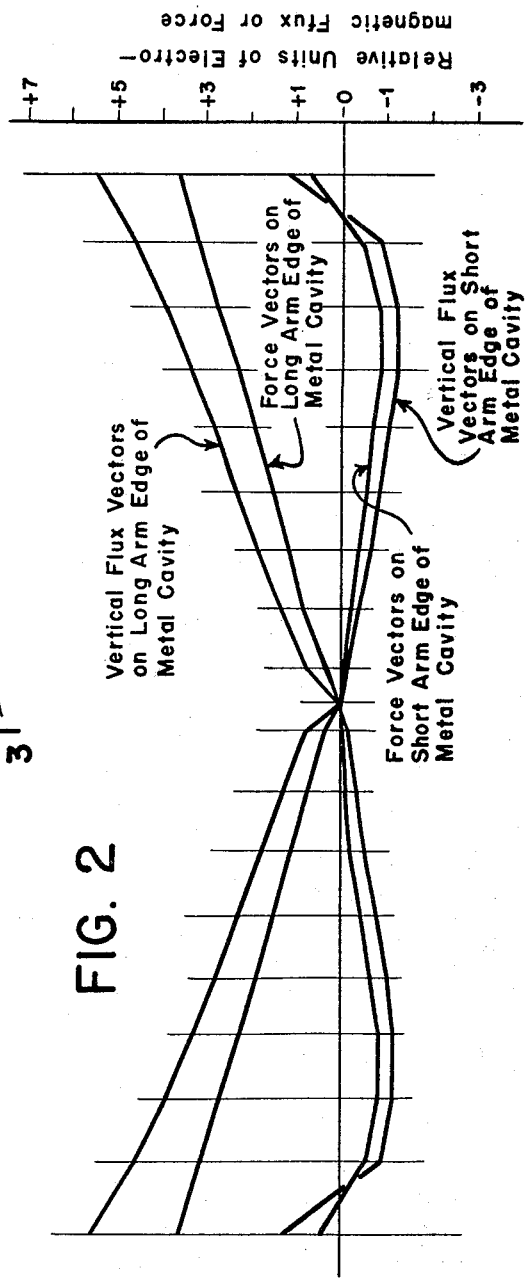
INVENTOR
Arthur F. Johnson INVENTOR
Arthur F. Johnson INVENTOR
Arthur F. Johnson

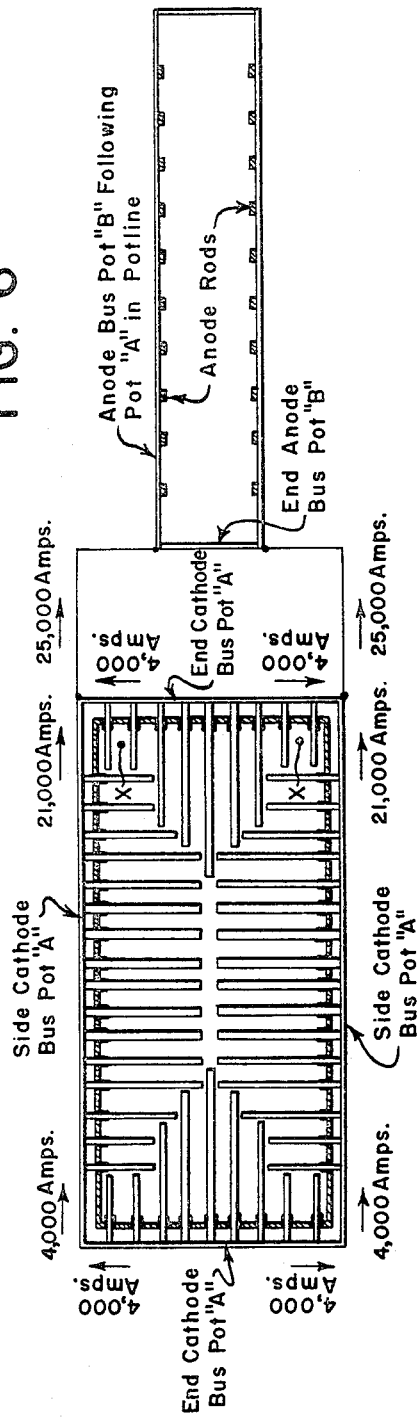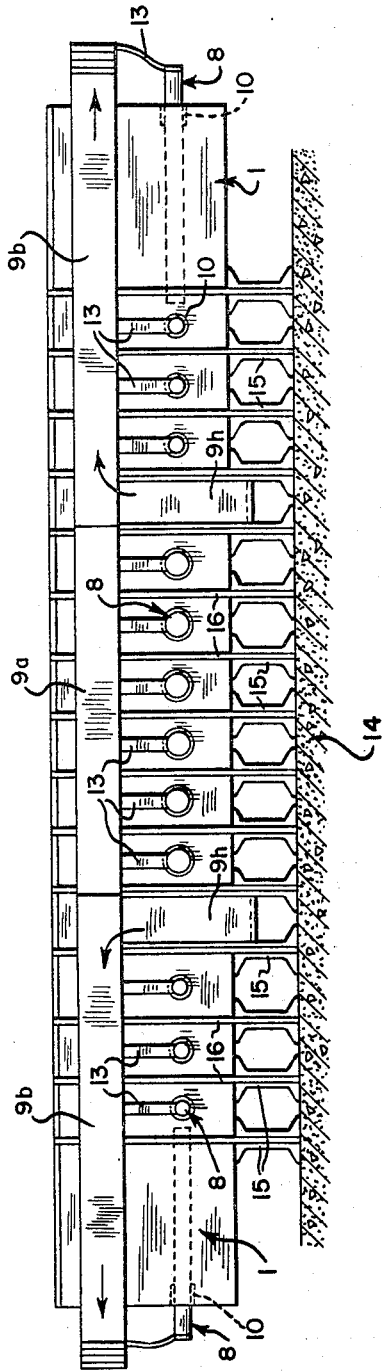

INVENTOR
Arthur F. Johnson

United States Patent Office 3,385,778
Patented May 28, 1968

3,385,778
CURRENT COLLECTING METHOD AND APPARATUS FOR ALUMINUM REDUCTION CELLS
Arthur F. Johnson, Riverdale, N.Y., assignor to Aluminum Company of America, Pittsburgh, Pa., a corporation of Pennsylvania
Filed Oct. 21, 1964, Ser. No. 405,371
13 Claims. (Cl. 204—243)

This invention relates to the Hall type cells for the electrolytic production of aluminum and to the so-called "pot-lines" employing such cells, and provides certain improvements in such apparatus which improve the production, thermal and electrical efficiencies. The Hall type pots are rectangular, carbon lined vessels in which the cryolite fusions of alumina are reduced. The carbon lining (usually covered by a layer of molten aluminum) is the cathode and it is an object of the invention to provide an improved arrangement, composition and size of cathode collector bars, potlining and current collecting cathode bus bars for such pots.

As larger capacity Hall type pot lines are designed and operated with currents now exceeding 100,000 amperes, operating difficulties are caused by electro-magnetic stirring of the reduced molten aluminum layer underlying the cryolite fusion causing "heaping-up" of the aluminum layer locally as much as 1.5 inches. The condition is brought about by electromagnetic effects and the fact that the molten aluminum has a specific gravity of about 2.3 and the cryolite fusion has a specific gravity of about 2.1 and the croylite fusion separating the bottom face of the anode carbon electrodes and the underlying molten aluminum layer may average only 1.5 to 2 inches. It is apparent that local short circuiting of anode carbon electrodes and molten aluminum cathode may occur. In practice, momentary shortcircuits do occur and are evidenced by violent fluctuations of current on individual electrodes. These are self-aggravating since the current surges also cause heaping. Even more common are large and more persistent variations in current density between faces, or parts of the faces, of anode electrodes and the aluminum layer, and variations in current density in the cathode carbon pot lining and the cathode bars imbedded therein. In practice such variations may result in low faraday ampere efficiency accompanied by red-hot anode rods, cathode rods eaten up by molten aluminum reaching them through cracks in the carbon pot lining and finally by holes burned through the steel pot shell which cause the pot to be shut down for repair.

Local electromagnetic effects such as circulation and heaping up of metal are directly proportional to the local current density in the molten aluminum and local magnetic flux therein. Since, in any particular pot design, both current and magnetic flux at each given point are proportional also to the overall current load carried by the potline, any local electromagnetic effect is proportional to the square of the amperage carried by the potline, and this limits pot production from day to day as well as limits new pot construction. This invention achieves an alleviation of the present severe limitations of potline amperage and hence pot productive capacity in a practical manner with minimum expense for labor and material.

Electromagnetic stirring in the molten metal of an aluminum pot is an action similar to the motion caused by the armature of an electric motor when a current passes through it while the armature is in a strong magnetic field. Some effects are caused by the horizontal magnetic flux from the anode bus reacting with the vertical currents traveling downward through the metal layer from anodes to pot lining. These are of small importance excepting near the pot ends where anode bus currents are large. The most violent stirring and heaping up of the molten aluminum occurs on account of horizontal electric currents in the molten metal under the influence of vertical magnetic flux vectors originating from the cathode bus that in present practice often forms a complete ring about the pot in the "side by side" arrangement of pots in the potroom. Horizontal currents in the molten aluminum occur because the carbon cathode (even without allowance for cracks therein) has a specific resistance about 200 times greater than aluminum and the cathode collector bar about 40 times greater than molten aluminum. With an aluminum layer perhaps 5 inches thick compared to a 10 inch thick potlining currents passing vertically down through the cryolite fusion from the anodes tend to travel sideways through the metal layer because an appreciable proportion (perhaps ⅓ to ⅔) of the current traveling horizontally below the metal layer must inevitably travel sideways in the carbon potlining and the balance in the steel collector bars because of the relative resistance of the carbon potlining and the steel bars. Since the steel collector bars are unable to compete with the carbon potlining in carrying substantially all current towards the pot sides, they are much less able to compete with the molten aluminum which gathers the current from the anodes above it and tends to concentrate the current around the periphery of the molten metal pad from whence current distributes (as noted above) between potlining and collector bars as it travels to the pot sides. High current density in the molten-metal-potlining interface close to the strong magnetic flux from cathode side and end buses causes severe electromagnetic effects.

Other major causes of horizontal currents in the molten aluminum are non-conductive patches on the interface between potlining and molten aluminum so it is important to keep the total conductive potlining in contact with molten metal at a maximum to reduce average current density at the molten-metal-potlining interface.

In recent prior art considerable effort has been directed to lessening electromagnetic effects of heaping and circulation by avoiding sideways electric currents in the metal layer by confining exposed collector bars in the potlining to areas immediately under the anodes but such confinement increases resistance of the potlining since higher current density is employed. This invention contrasts with such prior art in not confining the current to areas of potlining directly under the anodes but encouraging the current to travel not only vertically downward into the potlining but spread horizontally not in one but several directions to permit the lowest possible horizontal current density where maximum vertical magnetic flux exists and yet a very low average current density exists in the entire cathode potlining. This parallels the well-proven practice of lowering anode current density and thus $RI^2$ losses to increase Hall process efficiency by which kilowat hours per pound have been reduced from 12 or more 60 years ago to 7 to 8 at present. While this invention effects decreasing cathode current density generally, it does not aim at equal reductions in every part of the cathode since it is advantageous to carry high cathode current densities in parts of the pot where vertical magnetic flux is low so that lower cathode current densities may be obtained in areas of the pot where the vertical magnetic flux is high and where stirring and heaping could thus occur. By spreading the current from the anodes into the metal in all possible directions where vertical magnetic flux is high the diverse horizontal currents in the metal produce resultants which are too small to be harmful.

Such higher cathode current densities in local areas of low vertical magnetic flux are effected by locating a greater number of steel collector bars relative to the carbon potlining cross-section or by larger diameter bars or longer bars or ones more electrically conductive than steel or by use of graphitized potlining, thinner potlining, or a combination of these. Furthermore, this invention provides collector bars horizontally disposed through the ends as well as the sides of the steel pot shells since (a) not only are cathode current densities considerably decreased thereby and (b) horizontal currents in the metal layer divided between a flow sideways and a flow endways but (c) vertical magnetic flux caused by cathode buses is decreased near the ends of the pot where it has been most troublesome since the current gathered by the cathode buses from the steel collector bars imbedded in the potlining reaches a maximum at the ends of the pot.

The invention will be better understood with reference to the following discussion and accompanying drawings in which:

FIG. 1 is a side view of an improved Hall type pot of the invention as in a "side by side arrangement" of pots in a pot line;

FIG. 2 is a diagram of estimated electromagnetic vertical flux and resulting relative force along edges of molten aluminum nearest respective long arm or short arm side of the pot illustrated in FIG. 1;

FIG. 6 illustrates the apparatus of a one line electrical circuit diagram of this invention in the "end to end" potroom layout commonly used with Soderberg electrodes;

Figure 7:
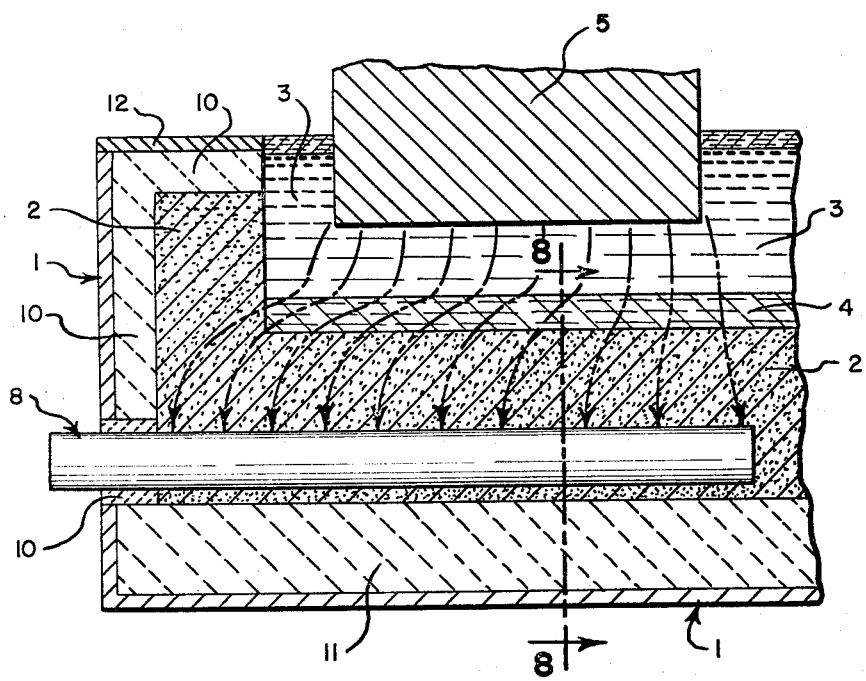
FIG. 7 is an enlarged vertical cross-sectional through a corner portion of FIG. 3 showing the collector bar and how the electric current tends to travel sideways in the molten metal and carbon potlining due to the conductivities of sections of these materials compared to the steel collector bars.
Figure 8:
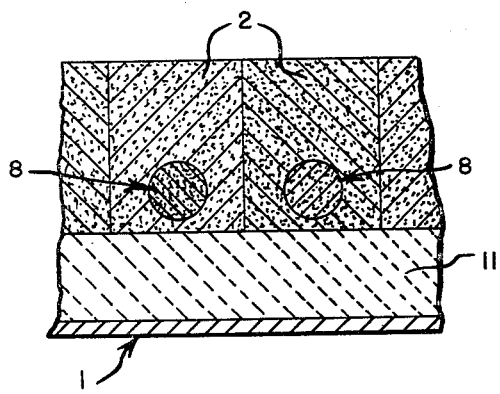

FIG. 8 is a vertical cross-section at 8—8 of FIG. 7 showing how the pot lining may be made up in prebaked blocks and collector bars attached in grooves therein by carbon paste or cast iron; and FIG. 9 illustrates in longitudinal side view a pot advantageously providing one or more auxiliary buses cross-wise underneath the pot to thereby join the longitudinal side cathode buses together at, for example, points about midway between the vertical centerline of the longitudinal sides and the ends.

In FIGS. 1, 3, 5, 7, 8 and 9 the rectangular steel potshell 1 forms a steel box with an open top while 2 is the carbon potlining commonly made of calcined anthracite coal mixed with tar and pitch and rammed into the steel box and baked or prebaked in the form of blocks containing one or more collector bars fastened therein with carbon paste or cast iron somewhat as shown in FIG. 8. Such anthracite coal or prebaked carbon blocks may be calcined electrically and thus graphitized fully or in part to attain greater or lesser electrical conductivity.

Figure 3:
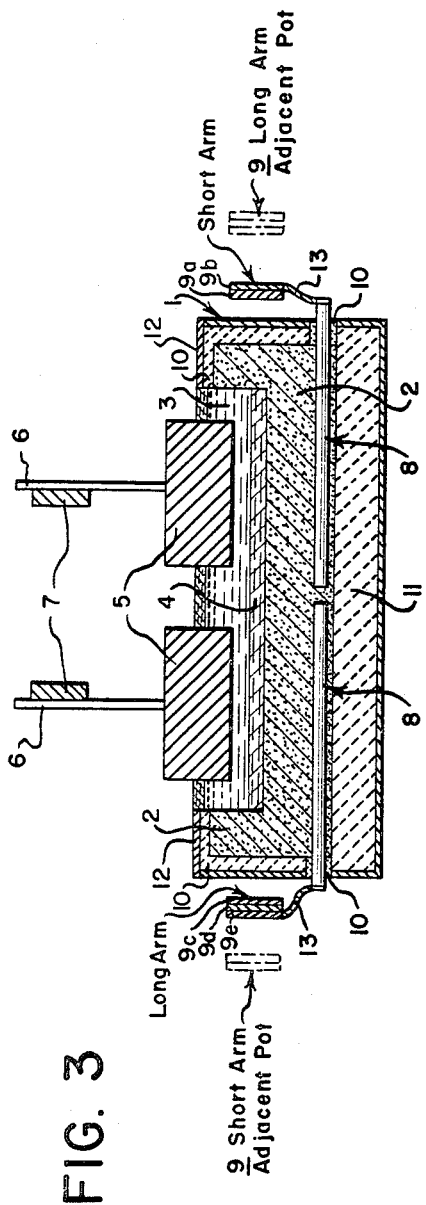
FIG. 3 is a vertical cross-section at 3—3 of FIG. 1.

The cryolite fusion 3 attains a temperature of 900 to 1000° C. excepting on the surface exposed to air where a crust forms as shown in FIG. 3 and FIG. 7, and the underlying layer of molten aluminum 4 at similar temperatures forms a metal pad. Ususally two rows of anode carbons 5 are suspended in the cryolite fusion by the copper or aluminum anode rods (and their steel stubs affixed thereto) 6 which conduct current downward from the aluminum anode bus 7 while the steel cathode rods 8 imbedded in the carbon potlining conduct current outward to the aluminum cathode bus bars 9 via the copper or aluminum strap 13.

Figure 5:
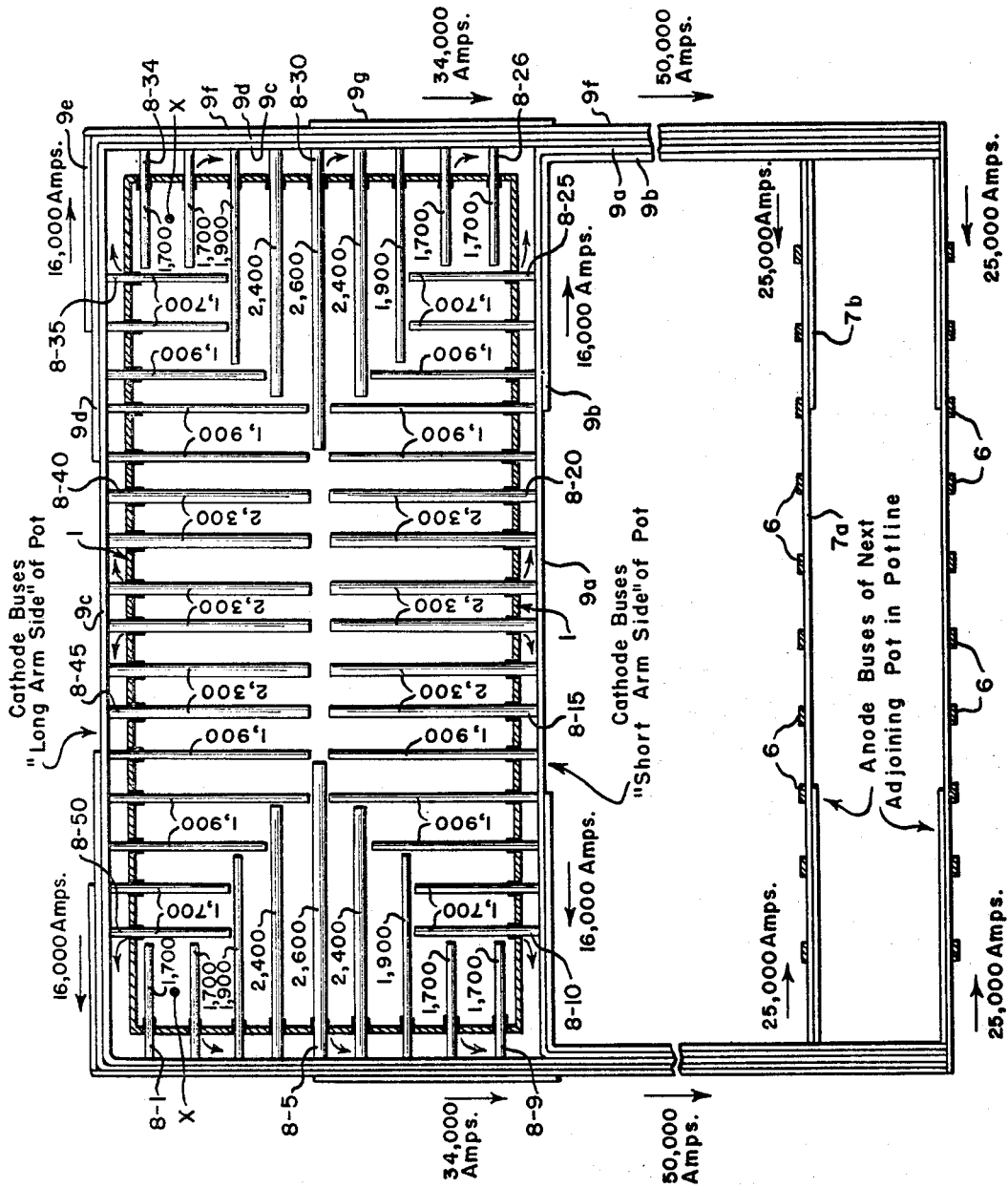
FIG. 5 is a horizontal cross-section at 5—5 through the cathode bus and collector bars of the pots of FIG. 1 together with a plan view of the anode bus of the next adjoining pot in the potline and the connecting bus between, thus showing the metallic electric circuit in a "side by side" potroom layout.

As shown in FIG. 5 in the "side by side" potroom layout, the cathode bus bars form a complete ring around the pot shell accumulating current therefrom and delivering it to the anode bus of the next adjoining pot in electrical series of pots that make up a potline. To conserve heat a granular or brick type of heat insulation or refractory 11 is used on the bottom and sides of the pot while a thinner refractory insulating material 10 may usually be used to electrically insulate the collector bars from the pot shell and insulate the deck plate 12 (on which the men stand when adjusting electrodes) from the potlining. The pot is conveniently cooled on its exterior steel sides by atmospheric convection promoted by suporting it off the concrete or refractory brick floor 14 as shown in FIG. 9 by pairs of steel channel irons 15 welded or riveted to thick steel plates 16 sandwiched between them to form buttresses preventing expansion of the long steel sides of the pot and thus preventing heaving of the potlining.

In FIG. 1 and FIG. 5 the fifty collector bars used by way of illustrating an example are shown numbered counterclockwise from 8–1 to 8–50 with carrying current values being drawn as an example of important novel features of this invention since it is common practice to employ collector bars of identical diameter and hence similar current drawing capacity. It is not common practice to employ collector bars disposed from the ends of rectangular pots but only from sides. In FIG. 1, FIG. 3, FIG. 5 and FIG. 9 are shown how the anode bus bar leaves 7a and 7b make up the anode bus and how the cathode bus bar leaves 9a to 9h are used to build up the respective bus bars 7 and 9 to hold current densities therein to reasonable values to prevent overheating and, in case of the cathode buses, to compensate for the extra length of the long arm bus so that it will have about the same voltage drop as the short arm bus and thus keep the amounts of current collected from the short arm side of the pot about about the same as the long arm side.

Historically the most harmful electromagnetic effects have always been experienced on the long arm side of rectangular Hall pots set in the side by side ararngement. That is, more red anode rods appeared there, more pots burned through the potsides there, and more collector bars were found eaten up by the molten metal there and particularly near the ends of the pots where the vertical magnetic flux of the cathode end bus adds to the vertical magnetic flux of the long arm cathode bus leaves 9c, 9d and 9e to produce a maximum vertical magnetic flux at the point marked X in FIG. 5.

This invention reduces the vertical magnetic flux at the point X to form ¾ to ⅔ the original amount on the long arm side where it is most troublesome and in additon fractionizes to about ⅔ the horizontal currents traveling in the molten aluminum so the force in the molten metal tending to make it heap or circulate at the troublesome areas is reduced to about one-half. Principally this is done by disposing collector bars through the end of the rectangular pot shell as well as through the sides to thus reduce the current in (and hence electromagnetic flux from) the side buses to ¾ to ⅔ their former value with the remainder of the current being drawn from the ends of the pot cathode buses and collectors bars attached thereto. The horizontal currents traveling in the molten aluminum as illustrated in FIG. 7, have their values near point X divided into components flowing to the long arm side and at right angles flowing towards the pot end. The resultant of these two right angle components each with an assigned unit value of 1 is equal to the square root of 2 or 1.414. Since the current components so divided would total 2 if the pot of this invention did not utilize end collector plates and allowed all current to flow to the pot sides, it is apparent this invention reduces current in the metal at point X and generally along a line equidistant from pot sides and ends to 1.414 divided by 2 or roughly 0.7. With vertical flux from the cathode buses likewise reduced to ¾ to ⅔ their former value as noted above the force in the metal which is proportional to both magnetic flux and current flow is reduced to about one-half. This derives from the law of physics in which the force tending to make a conductor move when it is carrying electric current and is introduced into an electrical field with lines of flux acting at right angles to the direction of the current in the conductor is a force tending to make it move in a direction at right angles to both current and flux with the force being proportional to both the current and the magnetic flux.

Another rule of electromagnetism useful to the understanding of the utility of this invention is the so-called "hand rule" which states that if an electrical conductor is grasped by the right hand with the thumb pointing in the direction of the current, the fingers will point in the direction of the magnetic flux caused by the current. The flux density is proportional to the current in the conductor and inversely proportional to the distance away.

Figure 4:
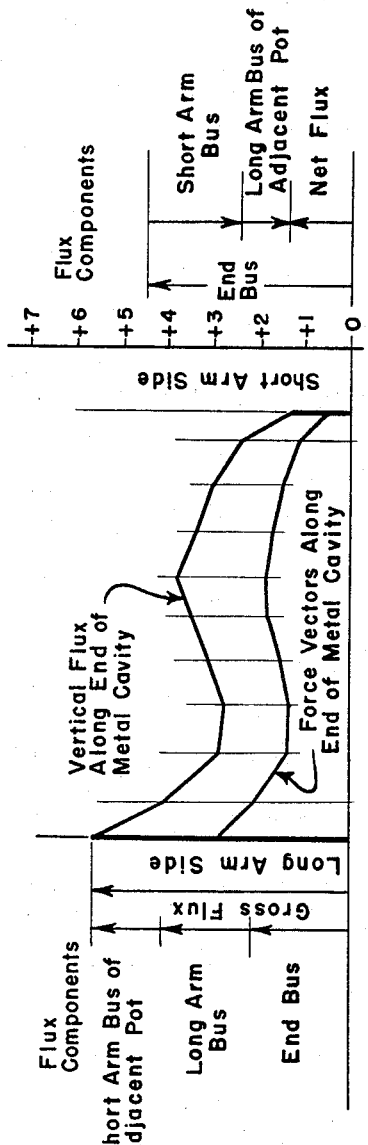
FIG. 4 is a diagram of estimated electromagnetic vertical flux and resulting relative force along edges of molten aluminum nearest the ends of the pot of FIG. 3.

FIG. 2 diagrams the vertical magnetic flux components of the cathodic buses principally causing the flux, and by application of the above rules, it is apparent why the maximum magnetic flux on the molten aluminum is at the point X on the long arm corner of the pot since the effect of the end bus adds to the effect of the long arm side bus there. In contrast, on the short arm corner of the pot the effect of the end bus is opposite to that of the short arm side bus and the net flux is much less than at point X on the long arm side where end bus and side bus flux components are additive. The entire profile of magnetic flux in the pot of this invention can be studied in the diagrams of FIG. 2 and FIG. 4 bearing in mind that the net flux in the longitudinal centerline of the pot resulting from the longitudinal side cathode buses is zero since they neutralize each other and only the end bus flux remains and is a maximum, of course, at the ends of the pot near the end bus. Midway between the ends of the pot the flux density is zero because practically no current flows in the cathode buses (or anode buses either). Along the longitudinal centerline of the pot there is a band where the vertical magnetic flux is very low except near the ends of the pot where the magnetic flux from the end bus exerts its effect. This invention is contrived to extract current from such areas of low vertical magnetic flux by the use of larger collector bars or more conductive potlining (or similar means previously enumerated). For example, collector bars shown in FIG. 1 and FIG. 5 as 8–4, 8–5, 8–6, 8–15, 8–16, 8–17, 8–18, 8–19, 8–20, 8–29, 8–30, 8–31, 8–40, 8–41, 8–42, 8–43, 8–44, and 8–45, may be made larger in diameter than the other collector bars in the pot to draw the greater amounts of current exemplified by the current values shown in FIG. 5 without causing excessive amounts of electromagnetic circulation or heaping in the areas wherein they lie. By so doing it will be noted that horizontal electrical currents in the molten metal are divided to flow not only towards the sides of the pot but towards the ends and towards the middle longitudinally as well as crosswise. For this reason the relative force vector lines in FIG. 2 and FIG. 4 are shown to be ⅔ the amount of the flux vectors in this invention. In practice prebaked graphite blocks are sometimes used for a complete potlining, but only to a minor extent on account of their expense. This invention justifies use of graphitic potlining with larger collector bars in specific localities as, for example, in the case of at least some of bars 8–4 to 8–6, 8–15 to 8–20, 8–29 to 8–31, and 8–41 to 8–45, since with a relatively small amount of expensive graphite a significant improvement in efficiencies may be achieved through lesser electromagnetic effects and lower voltage drop and hence lower RI² power loss in the potlining on account of lesser resistance of the graphite. It should be understood that the ampere values assigned to collector bars in FIG. 5 and buses in this figure and other figures are given by way of illustration of a specific example and that by the choice of bars and buses of various sizes and conductivities a variety of current values could be obtained suitable to the practice of this invention.

Another advantage of this invention is that the resistance to the electrical current in traveling from the molten metal to the cathode ring bus is less not only on account of the additional collector plates, but the fact that the potlining in the ends of the pot are now employed to carry electricity horizontally. Without end collector bars the current carrying capacity of the potlining in the ends is wasted since (as previously mentioned) the potlining can obviously carry ⅓ to ⅔ of the current moving sideways or endways compared with the collector bars. Definitely contributing to the lower potlining resistance is the fact that the interface between molten metal and potling on the pot end perimeter is likewise utilized. In old potlinings where carbide incrustations at the interface interfere with current conduction this interface resistance may be a large fraction of the total resistance from molten metal to cathode bus. It may account for 0.1 volt or more voltage loss out of 0.4 volt drop between molten aluminum and cathode bus.

Another advantage of this invention is that it tends to make the ends of the pot shell run at a temperature comparable with the sides of the potshell whereas in conventional design the ends might be 50 to 100° F. lower. For example, ends might average 225° F. compared with 300° F. average temperature of the sides in a conventional design. It is important to decrease the temperature of the sides of the potshell so that potside burnouts previously described will not occur. Likewise it is important to increase the temperature of the potlining on the ends of the pot so that the crusts on the cryolite fusion will not be as hard around the end electrodes as they always are now. Presently and traditionally, extra work is required by the men who replace a worn-down (or butt carbon) anode with a new electrode at the pot corners because the cryolite crusts are harder to break there.

The cathode buses act as a heat sink for heat conducted out of the pot by the collector bars. This invention by connecting collector bars to cathode buses on the ends of the pot provides a greater length of cathode bus to act as a heat sink.

While the methods outlined above will usually reduce electromagnetic effects to such low amounts that they are not troublesome in pots carrying less than 100,000 amperes, designs carrying more than this value may advantageously utilize two or more auxiliary buses as illustrated in FIG. 9. FIG. 9 is a longitudinal sideview on the short arm side of a pot of this invention where $9h$ are auxiliary copper or aluminum buses running under the potshell. By way of example, currents of 4,000 amperes is indicated as passing in the buses $9h$ from the long arm cathode bus transversely under the potshell to the short arm bus visible in FIG. 9. Benefits in lower magnetic flux effect from the end bus at point X and all along the end of the molten metal pad are derived because (a) the long arm side buses and end buses thereby carry 4000 less amperes and (b) the vertical magnetic flux from the auxiliary bus $9h$ opposes the vertical flux of the end bus at point X and all along the end of the molten metal pad. Although 4000 amperes was chosen as a nominal amount for the purpose of example, it is obvious the bus $9h$ can be positioned and sized to take any amount of current desired to reduce the magnetic effect of the end bus all along the end of the pot as well as the long arm cathode side bus at troublesome point X. By means of small auxiliary buses drastic reductions in maximum electromagnetic effects are achieved.

From the foregoing one may see that in the "side by side" potroom layout the methods of this invention will reduce the electrical resistance through the potlining and likewise reduce maximum electromagnetic effects in pots of very high amperage to mere fractions of values that would be afforded otherwise.

Turning now to consider the application of this invention to the "end to end" arrangement of potroom layout commonly used with Soderberg electrodes, FIG. 6 illustrates by means of a one line electrical circuit diagram the collector bars and cathode and anode buses of a pot of this invention designed by way merely of an example to carry a total of 50,000 amperes. A cathode bus is usually provided to form a complete ring bus around the pot and collector bars disposed horizontally inward from the ring bus through the ends as well as the sides of the pot and the collector bars on the ends graduated in length so as to be longest near the longitudinal centerline of the pot where electromagnetic flux and force is practically zero. The "end to end" potroom arrangement is remarkably benefitted at the points X near the pot ends where maximum electromagnetic effects have historically been experienced. By means of the hand rule it is obvious that the magnetic flux of the end buses opposes the flux of the side buses at points X and the horizontal currents in the metal pad as illustrated by FIG. 7 are divided to flow towards the ends of the pot as well as the sides. It is essential in the design of this invention to provide a cathode bus at the end of the pot where the currents in the side buses reach a maximum so that collector bars attached to the end buses may reduce the current carried in the side buses as exemplified by the amperage figures used on the buses of FIG. 6 which, of course, merely illustrate what can be accomplished in one particular case. It is highly advisable that this design also provide a cathode bus on the opposite end of the pot so that a complete cathode ring bus is effected and collector bars disposed from both ends so that cathode current density is reduced to a minimum average but is higher than the average in parts of the pot where vertical magnetic flux is low as taught in the discussion of the "side by side" arrangement of potroom.

Although some form of carbon has been the common material used in potlining, new materials are under development which are electrically conductive and refractory to chemical attack by molten metal and cryolite. These include nitrides, carbides, borides and cyanonitrides of aluminum silicon, titanium, zirconium and other metals. Where the term potlining is used in this invention, it is understood to include the above alternate materials to the extent that they are used in the potlining which forms a container for the molten metal and cryolite and an electrical conductor to carry current to collector bars imbedded therein.

In the operation of the process of this invention on existing potlines converted to this design it will not usually be found as advantageous to operate at the same current as previously carried but rather to increase the potline current in order to achieve greater production of aluminum from the potline. Although it might be thought that no greater current might be carried in a given size of potshell without also increasing size of the anode electrode area (as with larger electrodes or more of them) it will usually be found that at least 5% or 10% more current may be carried in the same electrodes since with less electromagnetic effects causing individual electrode variations in current density ampere efficiency improves and the pots run cooler thus requiring an increase in current to make the pots more workable. With less tendency to get red hot anode rods from metal heaping greater current density can be safely carried on the electrodes. Of course, with more collector bars and more evenly distributed heat in the cathode potlining it runs cooler and requires more current to avoid mucky metal-potlining interface and hence for best operation of the pot. The above will be found ordinarily to be the case with either Soderberg electrodes or prebaked electrodes and in either the "side by side" layout or "end to end" layout of potline.

Where conventional design pots are altered to this design one by one as they are removed from the potline for normal pot relining, it will not be possible to increase the current in the potline until all pots are provided with end collector plates. However, each pot relined with collector bars on one or both ends may be started in the potline and operated at low potlining drop, high ampere efficiency and long potlining life to thus achieve a part of the advantages possible with this invention. More heat insulation may be needed in the bottom of the pot or dampers to restrict air cooling of the potshell bottom.

When new potlines are to be designed, the practice of this invention will permit much higher currents to be carried without serious electromagnetic effects and without high investments in bus to counteract the magnetism. Since bus-work investment may equal investment in all other pot elements, this is an important consideration. This invention is directed to horizontal cross sections that are rectangular and sometimes twice as long as wide to attain a perimeter that is relatively large as compared to the area so that this large perimeter will constitute an effective conductor through which to extract the cathode current both with collector bars and carbonaceous potlining even when the carbonaceous, electrically-conducting portion is confined to the area beneath the anodes or molten aluminum pad. It contemplates choosing lengths of the individual collector bars disposed from one or both ends of the pot so as to form a V-shaped pattern in horizontal cross section as shown in FIG. 5 and FIG. 6. It advocates lengths for each side collector bar near pot corners such as to meet or almost meet an end collector bar for by this means the volume of the potlining and metal layer above from which current may be extracted in at least two directions is extended. Also by this invention the greatest amount of current possible is extracted from a belt down the longitudinal centerline of the pot where vertical magnetic flux from the two cathode buses is neutralized so no appreciable electromagnetic effects will occur in that belt away from the ends even though there are some horizontal currents in the molten aluminum flowing sideways from under the electrodes toward the pot longitudinal centerline.

In summary, this invention is directed to decreasing electromagnetic circulation and heaping by neutralizing magnetic flux with cathode collector bar and bus rearrangement and decreasing these electromagnetic effects by decreasing horizontal currents in the metal, by dispersing these in two or more horizontal directions (instead of a single direction) while at the same time decreasing the voltage drop between the molten metal and the cathode buses. This invention more effectively utilizes the cathode potlining of the Hall cell by more completely using the current conducting properties of the potlining.

I claim:

1. In a rectangular vessel assembly adapted to the electrolytic reduction of cryolite fusions of alumina to molten aluminum, including an electrical conducting lining positioned in said vessel as a cathode and cathode collector elements arranged in current collecting engagement with portions of said lining and electrically connected to current carrying bus disposed exteriorly of said vessel, the improvement of providing said bus along each side and along at least one end of said vessel and so disposing said bars in said lining that parts of the current collected from the lining are drawn to the bus portions along each side from lining portions adjacent to each side bus portion and that another part of the current collected from said lining is drawn to the bus portion along the end of said vessel from lining adjacent said end bus portion.

2. The assembly of claim 1 characterized by the fact that only one end bus portion is employed and that it is connected to the side bus portions at that end of said vessel which is adjacent the extremities of the side bus portions at which flows the greater part of the current collected from the lining adjacent said side bus portions.

3. The assembly of claim 1 characterized by the fact that collector bars electrically connected to an end bus portion are substantially parallel the side walls of the vessel and collector bars electrically connected to a side bus portion are substantially parallel the end walls of said vessels whereby end bus contacted collector bars are disposed in said lining approximately at right angles to side bus connected collector bars disposed in said lining.

4. The assembly of claim 1 characterized by the fact that the current carrying bus disposed exteriorly of said vessel is adjacent both sides and both ends thereof thereby to form a conductive bus ring exteriorly around said vessel and that the collector bars disposed in said lining are so disposed and so connected to said ring that current collected from lining disposed in the end portions of said vessel is primarily directed to bus portions adjacent each said end thereby to reduce the current collected from the lining portions adjacent the sides of said vessel.

5. In a line of rectangular vessels arranged in side by side relationship each such vessel being adapted to the electrolytic reduction of cryolite fusions of alumina to molten aluminum and including an electrical conducting lining as a cathode therein with cathode collector elements electrically connected to current carrying bus disposed exteriorly of each said vessel arranged in current collecting engagement with said lining and wherein the current collected from the cathode lining of one such vessel is delivered to a succeeding vessel for anodic application thereto, the improvement of providing said bus along each side and at least one end of each said vessel and so disposing said bars in said linings that parts of the current collected from the linings are drawn to the bus portions along each side from lining portions adjacent to each said side bus portion and that other parts of the current drawn from said linings are drawn to the bus portions along the ends of said vessels from lining portions adjacent said end bus portions and arranging said current carrying bus so that current collected and delivered to bus adjacent the end of a first such vessel does not pass along bus disposed adjacent an upstream side of such vessel in its path to anodic application in the succeeding vessel.

6. In the production of aluminum by the electrolytic reduction of cryolite fusions of alumina disposed in a rectangular vessel lined at least in part with electrically conductive lining which serves as cathode during said reduction and from which is drawn by collecting means and to bus disposed exteriorly of said vessel the current imposed during said reduction, and in which production the current collected from lining disposed in a first side of said vessel is led by said bus around at least one end of said vessel to join current collected from the other side of said vessel, the improvement of collecting a part of the total current from the lining disposed adjacent at least one end of said vessel and feeding said current directly to the bus passing said end of said vessel thereby to reduce the flow of collected current around corners of said vessel.

7. In the production of aluminum by the electrolytic reduction of cryolite fusions of alumina disposed in a rectangular vessel lined at least in part with electrically conductive lining which serves as a cathode during said reduction and through the surfaces of which is drawn by means of collector bars disposed in said lining the current imposed during said reduction which current is delivered by said collector bars to current carrying bus located exteriorly of said vessel, the improvement of so adjusting the relative resistance of said lining and the location and resistance of said collector bars that at least in some areas the current drawn through the surface of said area is approximately inversely proportional in density to the density of vertical magnetic flux existing at said area whereby to remove from said vessel larger fractions of the current flowing through said lining at areas where vertical magnetic flux is comparatively minimal.

8. The process of claim 7 characterized by the fact that the said resistances are adjusted at least in material part by the employment of collector bars of different diameters.

9. The process of claim 7 characterized by the fact that the said resistances are adjusted at least in material part by the employment of collector bars of varying lengths.

10. The process of claim 7 characterized by the fact that the said resistances are adjusted at least in material part by providing in said lining areas of varying conductivities.

11. The process of claim 7 characterized by the fact that the said resistances are adjusted at least in material part by employment of collector bars of relatively different conductivities whereby to positively control the amount of the total current removed from the lining by a given collector bar.

12. The process of claim 7 characterized by the fact that resistance to the passage of current being collected is adjusted at least in material part by location of the collector bars relatively closer to the upper surface of said lining in at least some areas of relatively minimal vertical flux.

13. The process of claim 7 characterized by the fact that resistance to the passage of current being collected is adjusted at least in material part by grouping of relatively more collector bars in lining which is in areas of relatively minimal vertical flux than in areas of relatively great vertical flux.

References Cited

UNITED STATES PATENTS

| | | | |
|---|---|---|---|
| 2,804,429 | 8/1957 | Wleugel | 204—243 |
| 2,824,057 | 2/1958 | Thayer | 204—243 |
| 2,874,110 | 2/1959 | Thayer | 204—243 |
| 2,999,801 | 8/1961 | Wleugel | 204—244 |
| 3,063,919 | 11/1962 | Jouquet et al. | 204—243 |

HOWARD S. WILLIAMS, *Primary Examiner.*

D. R. VALENTINE, *Assistant Examiner.*